United States Patent Office 2,793,218
Patented May 21, 1957

2,793,218

9α-HALO-11-KETO-17-ALKYLTESTOSTERONES

Milton E. Herr, Kalamazoo, Mich., assignor to The Upjohn Company, Kalamazoo, Mich., a corporation of Michigan No Drawing. Original application August 8, 1955, Serial No. 527,118. Divided and this application May 10, 1956, Serial No. 583,922

3 Claims. (Cl. 260—397.45)

This invention relates to novel 17-alkyl-17-hydroxy steroids and esters thereof.

It is an object of this invention to provide novel 9α-halo - 11β - hydroxy - 17 - alkyltestosterones, 9α - halo-11 - keto - 17 - alkyltestosterones, 17-esters thereof, and intermediates in the production thereof. Another object is the provision of processes for the production thereof. Other objects will be apparent to those skilled in the art to which this invention pertains.

According to the present invention, the novel 9α-halo-11β - hydroxy - 17 - alkyltestosterones, 9α - halo - 11-keto - 17 - alkyltestosterones and 17 - esters thereof may be prepared from 9(11) - dehydro - 17 - alkyltestosterone via the known 3 - pyrrolidyl enamine of 4,9(11)-androstadiene - 3,17 - dione (II) [Heyl and Herr, J. Am. Chem. Soc., 77, 489 (1955)], 11β - hydroxy - 17 - methyltestosterone or esters thereof (I) or 11α - hydroxy - 17-methyltestosterone or esters thereof (U. S. Patent 2,660,-586) (I) as shown by the following formulae:

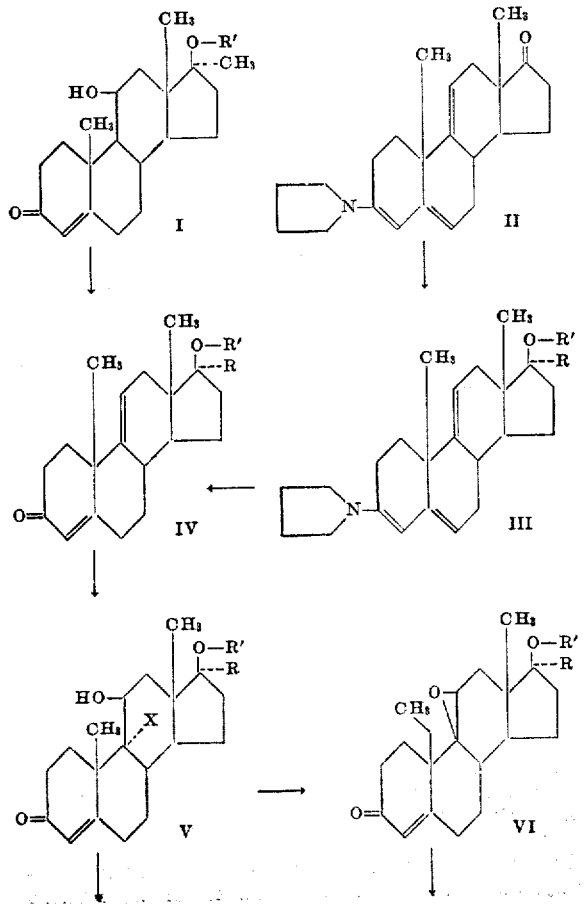

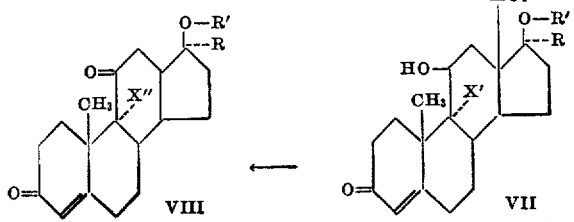

wherein R is a lower-alkyl group containing less than three carbon atoms, i. e., methyl or ethyl; R' is hydrogen or the acyl radical of a hydrocarbon carboxylic acid containing from one to twelve carbon atoms, inclusive; X is a halogen having an atomic weight from 79 to 127, inclusive, i. e., bromine or iodine, X' is a halogen having an atomic weight from 19 to 36, inclusive, i. e., fluorine or chlorine, and X" is a halogen having an atomic weight from 19 to 127, inclusive, i. e., fluorine, chlorine, bromine or iodine.

Following the series of reactions described hereinafter for the conversion of 11α - hydroxy - 17 - methyltestosterone (I) to 9α - hydroxy - 17 - methyltestosterone testosterone and esters thereof (VII), but substituting 10-normethyl - 11α - hydroxy - 17 - methyltestosterone (U. S. Patent 2,660,586) as the starting steroid, there are thus - produced 9α - fluoro - 10 - normethyl - 11β - hydroxy - 17 - methyltestosterone and 17 - esters thereof. These compounds are also potent oral anabolic agents possessing androgenic activity.

Reacting 9(11)-dehydro-17-methyltestosterone with a molar excess of diethyl oxalate and a molar equivalent of sodium methoxide in tertiary butyl alcohol is productive of the sodium enolate of the 2-ethoxyoxalyl derivative thereof. After neutralization of the solution with acetic acid and then brominating with a molar equivalent of bromine at about minus ten degrees centigrade, 2-bromo - 2 - ethoxyoxalyl - 9(11) - dehydro - 17 - methyltestosterone is produced. After removing the 2-ethoxyoxalyl group with sodium methoxide in methanol, the 2-bromo-9(11)-dehydro-17-methyltestosterone is dehydrohalogenated with refluxing collidine to 3-keto-17α-methyl-1,4,9(11) - androstatrien-17β-ol. Employing this compound as the starting steroid in the reactions for the conversion of 9(11)-dehydro-17-methyltestosterone to 9α-fluoro-11β-hydroxy-17-methyltestosterone and 17-esters thereof, there are thus-produced 3-keto-9α-fluoro-17α-methyl-1,4 - androstadiene - 11β,17β - diol and 17-esters thereof, e. g., a hydrocarbon carboxylic acid ester containing from one to twelve carbon atoms, inclusive, for example, of an acid named in the paragraph following Example 4. These compounds also possess androgenic activity and marked oral anabolic activity.

The novel 9α - halo-11β-hydroxy-17-alkyltestosterone and 17-esters thereof (VII) and 9α-halo-11-keto-17-alkyltestosterone and 17-esters thereof (VIII) possess marked androgenic activity and oral anabolic activity. For example, 9α-fluoro-11β-hydroxy-17-methyltestoterone possesses an oral anabolic activity about eighteen to nineteen times and an oral androgenic activity about ten times that of 17-methyltestosterone. Furthermore, it is considerably less toxic, and, surprisingly, it does not demonstrate the undersirable salt retention side-effect which one might expect of a 9α-fluoro compound. 9α-fluoro-11-keto-17-methyltestosterone possesses an oral androgenic activity which is more than twice that of 17-methyltestosterone and its oral anabolic activity is more than five times that of 17-methyltestosterone. Similarly, the corresponding 9α-chloro analogues possess high oral anabolic and androgenic activities as do the 17-esters of both the 9α-fluoro and 9α-chloro compounds. 9α-bromo- and 9α-iodo-11-keto-17-methyltestosterone and their 17-esters also possess anabolic and androgenic activity.

The novel androgens and anabolic agents of this invention, especially VII and VIII, are useful as male gonadal replacement therapy in prepuberal and post puberal castrates, in pituitary dwarfism, Simmond's disease, dysmenorrhea and for suppression of lactation. Their anabolic activity is useful in increasing weight, muscle strength and for increasing the sense of well-being and positive nitrogen balance in pituitary deficiencies. By adjustment of the dose, a favorable anabolic response can be achieved without noticeable androgenic response, if this is desired.

The novel androgen and anabolic agents of the present invention are normally administered orally, e. g., as tablets, capsules or in the form of flavored fluid preparations, in which may additionally be incorporated, if desired, an estrogen, e. g., estrone, estradiol, estradiol-21-β-cyclopentylpropionate, for combined androgen-estrogen therapy.

The following examples are illustrative of the products and processes of the present invention, but are not to be construed as limiting.

*Example 1.—9(11)-dehydro-17-methyltestosterone (IV)*

To a stirred solution of 100 grams of 11β-hydroxy-4-androstene-3,17-dione in one liter of dry pyridine was added, at room temperature and in a nitrogen atmosphere, sixty grams of N-bromoacetamide all at once. The resulting mixture was stirred for fifteen minutes and then cooled to ten degrees centigrade. Into the cooled solution was bubbled sulfur dioxide gas until the mixture gave a negative test with acidified starch-iodide paper. The mixture was diluted with four liters of water and cooled to about zero degrees centigrade for three hours. There was thus precipitated 4,9(11)-androstadiene-3,17-dione [Heyl and Herr, J. Am. Chem. Soc., 77, 488 (1955)], which after filtering, washing with water and drying, weighed eighty grams and melted at 197 to 203 degrees centigrade.

To a hot solution of 56.8 grams of 4,9(11)-androstadiene-3,17-dione in 800 milliliters of methanol was added 25 milliliters of pyrrolidine, whereupon product began to precipitate almost immediately. The solution was permitted to cool to room temperature and then was refrigerated at zero degrees centigrade for three hours. The crystalline precipitate was filtered, washed with methanol and then dried to give 59 grams of the 3-enamine of 4,9(11)-androstadiene-3,17-dione (II) (3-pyrrolidyl-3,5,9,(11)-androstatrien-17-one) (Heyl and Herr, loc. cit.) melting with decomposition above 165 degrees centigrade.

To a stirred solution of 700 milliliters of a four molar solution of methyl magnesium bromide in diethyl ether was added, dropwise and in a nitrogen atmosphere, a solution of 59 grams of the 3-enamine of 4,9(11)-androstadiene-3,17-dione (II) in one liter of strictly anhydrous tetrahydrofuran over a period of fifteen minutes. When addition was complete the mixture was warmed and the solvent distilled therefrom until the distillation temperature reached sixty degrees centigrade. While protecting it from moisture and atmospheric oxygen, the mixture was refluxed for eighteen hours. The solution was then cooled in an ice-water bath and 430 milliliters of water was then cautiously added thereto. With the mixtuer still under a nitrogen atmosphere, there was then added 260 milliliters of glacial acetic acid followed by one liter of methanol and the mixture was then heated until all the precipitated 3-enamine of 9(11)-dehydro-17-methyltestosterone (III) had dissolved.

To the solution containing the 3-enamine of 9(11)-dehydro-17-methyltestosterone (III) was then added 700 milliliters of ten percent aqueous sodium hydroxide and the mixture was then heated at its refluxing temperature for thirty minutes to hydrolyze the enamine group, thereby regenerating the Δ⁴-3-keto group. The mixture was then cooled to room temperature, acidified with acetic acid and then distilled at reduced pressure until a residual volume of about 1.5 liters was reached. After adding a mixture of 100 milliliters of concentrated hydrochloric acid and 100 grams of ice, the residue was extracted with 800, 500, 400 and 400 milliliter portions of methylene chloride. The combined extracts were washed successively with water, dilute sodium hydroxide and water and then dried. The solvent was distilled from the dried solution and the residue dissolved in a mixture of 100 milliliters of methylene chloride and 250 milliliters of benzene and chromatographed over 700 grams of activated alumina. The column was developed with 500 milliliters of benzene, two liters of Skellysolve B hexane hydrocarbons plus four percent acetone, two liters of Skellysolve B plus seven percent acetone, two liters of Skellysolve B plus eleven percent acetone, four liters of Skellysolve B plus fourteen percent acetone and finally, two liters of Skellysolve B plus seventeen percent acetone. The eluate fractions containing from eleven to seventeen percent acetone were combined and the solvent distilled therefrom to give crude product which, when crystallized from dilute acetone, gave 26.8 grams of 9(11)-dehydro-17-methyltestosterone (IV) melting at 167 to 170 degrees centigrade.

Following the procedure of Example 1 exactly, but substituting ethyl magnesium bromide for the methyl magnesium bromide, there is thus-produced 9(11)-dehydroxy-17-ethyltestosterone.

*Example 2.—9(11)-dehydro-17-methyltestosterone (IV)*

One-half gram of 11-keto-17α-methyltestosterone (U. S. Patent 2,678,933) was dissolved in three milliliters of absolute methanol and mixed with one-half milliliter of pyrrolidine at a temperature of about fifty degrees centigrade. The mixture was allowed to cool to room temperature, and, after about one-half hour, the 3-enamine of 11-keto-17-methyltestosterone [3-(N-pyrrolidyl)-17α-methyl-17β-hydroxy-3,5-androstadien-11-one] which had precipitated was removed by filtration and dried under vacuum. The yield of high purity 3-enamine product was 0.452 gram melting at 180 to 195 degrees centigrade with decomposition.

A solution of 1.79 grams of the 3-enamine of 11-keto-17α-methyltestosterone in a mixture of 25 milliliters of thiophene-free benzene and 25 milliliters of anhydrous ether was added dropwise with mechanical stirring to a mixture of one-half gram of lithium aluminum hydride and 85 milliliters of dry ether. The addition required about five minutes and stirring was continued for an additional fifteen minutes. Then with stirring, ten milliliters of ethyl acetate was cautiously added dropwise, followed by ten milliliters of water. The resulting mixture was concentrated in vacuo to a thick slurry. One-hundred milliliters of methanol was then added and the mixture stirred for ten minutes at a temperature of about fifty degrees centigrade. Then eighteen milliliters of five percent aqueous sodium hydroxide was added and the stirring continued at the same temperature for another ten minutes. After addition of five milliliters of acetic acid, the mixture was concentrated in vacuo. A mixture of fifty milliliters of water and eight milliliters of concentrated hydrochloric acid was added, and the solid product was recovered by filtration, washed with water, and dried in air. The yield of 11β-hydroxy-17α-methyltestosterone (I) was 1.29 grams; melting point 207 degrees centigrade. Recrystallization from a mixture of methylene chloride and Skellysolve B hexane hydrocarbons gave 0.977 gram of 11β-hydroxy-17α-methyltestosterone; melting point 209 to 211 degrees centigrade and having an $[\alpha]_D^{23}$ of plus 128 degrees in chloroform.

*Analysis.*—Calculated for $C_{20}H_{36}O_3$: C, 75.44; H, 9.49. Found: C, 75.14; H, 9.85.

To a stirred solution of one gram of 11β-hydroxy-17-methyltestosterone (I) in ten milliliters of dry pyridine was added, portionwise at 25 degrees centigrade and in a nitrogen atmosphere, 0.5 gram of N-bromoacetamide. Stirring was continued for fifteen minutes, the mixture then cooled to ten degrees centigrade and sulfur dioxide gas was bubbled into the cool solution until a negative test with acidified starch-iodide paper was obtained. Ten milliliters of water was then added to the mixture followed by a mixture of fifteen milliliters of concentrated hydrochloric acid mixed with 25 grams of ice. The precipitated solid was separated, washed with water, dried and then crystallized first from a mixture of methylene chloride and Skellysolve B (hexane hydrocarbons) and then from dilute acetone to give 9(11)-dehydro-17-methyltestosterone melting at 170 to 172 degrees centigrade.

*Example 3.—9(11)-dehydro-17-methylestosterone (IV)*

A warm solution of one gram of 11α-hydroxy-17-methyltestosterone (I, U. S. Patent 2,660,586) in two milliliters of dry pyridine was mixed with one gram of para-toluenesulfonyl chloride. The mixture was maintained at room temperature for eighteen hours and then poured into 25 milliliters of water. The mixture was stirred until the precipitated oil solidified. The solid was filtered, washed with water and dried to give 1.41 grams of 11α - (p - toluenesulfonyloxy) - 17α - methyl - 17β - hydroxy-4-androsten-3-one which melted at 144 to 148 degrees centigrade with decomposition and, after crystallization from a mixture of methylene chloride and hexane hydrocarbons, melted at 141 to 144 degrees centigrade with decomposition and had an $[\alpha]_D$ of plus 41 degrees in chloroform and the analysis below.

Calculated for $C_{27}H_{36}O_5S$: C, 68.61; H, 7.68; S, 6.78. Found: C, 68.86; H, 7.86; S, 6.89.

A mixture of one gram of the thus-produced 11α-(p-toluenesulfonyloxy) - 17α - methyl - 17β - hydroxy - 4 - androsten-3-one, 0.2 gram of sodium formate, 0.57 milliliter of water and fourteen milliliters of absolute ethanol was heated at its refluxing temperature for nineteen hours. The solution was cooled and then poured onto fifty grams of a mixture of ice and water with stirring. The resulting precipitate was filtered and dried to give 0.59 gram of 9(11)-dehydro-17-methyltestosterone which melted at 156 to 160 degrees centigrade and, after crystallization from a mixture of methylene chloride and hexane hydrocarbons, melted at 167 to 170 degrees centigrade and had an $[\alpha]_D$ of plus 57 degrees in chloroform and the analysis below:

Calculated for $C_{20}H_{28}O_2$: C, 79.96; H, 9.39. Found: C, 79.59; H, 9.08.

*Example 4.—9(11)-dehydro-17-methyltestosterone, 17-acetate (IV)*

A solution of 9(11)-dehydro-17-methyltestosterone in dry pyridine was treated with acetic anhydride, the molar ratio of steroid to acetic anhydride being about one to three, and the resulting mixture was heated under reflux for six hours. The mixture was then cooled, diluted with water while stirring, and the solid precipitate obtained removed by filtration. The solid was washed with two percent aqueous hydrochloric acid solution and with water, and then dried under vacuum. Recrystallization or chromatographic separation provides purified 9(11)-dehydro-17-methyltestosterone, 17-acetate. Similarly, 9(11)-dehydro-17-methyltestosterone is converted to other 9(11)-dehydro-17-methyltestosterone, 17-acylates by esterification of the 17-hydroxy group, e. g., by reaction with the appropriate acid anhydride, acid chloride or bromide, ester by ester exchange, acid in the presence of esterification catalyst, etc. Examples of 9(11)-dehydro-17 - methyltestosterones, 17 - acylates (IV, R=CH₃, R'=Acyl) prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, or other hydrocarbon carboxylic acid containing from one to twelve carbon atoms, inclusive, e. g., cyclopropylideneacetic, cyclopentylformic, cyclopentylacetic, β-cyclopentylpropionic, cyclohexylformic, cyclohexylacetic, β-cyclohexylpropionic, an aryl or alkaryl acid, e. g., benzoic, 2, 3, or 4-methylbenzoic, 2,3-, 2,4-, 2,5-, 2,6-, 3,4-, and 3,5-dimethylbenzoic, ethylbenzoic, 2,4,6-trimethylbenzoic, α-naphthoic, 3-methyl-α-naphthoic, phenylacetic, phenylpropionic, etc.

17-carboxylic acid esters of 9(11)-dehydro-17-ethyltestosterone are prepared in the same manner from 9(11)-dehydro-17-ethyltestosterone.

*Example 5.—9α - bromo - 11β - hydroxy - 17 - methyl - testosterone (V)*

To a solution of one gram of 9(11)-dehydro-17-methyltestosterone (IV) in fifty milliliters of acetone was added dropwise, with stirring, at fifteen degrees centigrade, one gram of N-bromoacetamide dissolved in 25 milliliters of water. A solution of twenty milliliters of 0.8 N perchloric acid was then slowly added at the same temperature. After twenty minutes, there was added a sufficient amount of a saturated aqueous solution of sodium sulfite to discharge the yellow color of the solution. The resulting mixture was then diluted with 100 milliliters of water thereby precipitating one gram of 9α-bromo-11β-hydroxy-17-methyltestosterone as needles melting at 153 to 155 degrees centigrade.

Similarly, 17-carboxylic acid esters of 9(11)-dehydro-17-methyltestosterone (V, R=CH₃, R'=—Ac), e. g., an ester named in the paragraph following Example 4, preferably the acetate, are similarly converted to a 17-carboxylic acid ester of 9α-bromo-11β-hydroxy-17-methyltestosterone.

Reacting 9α - bromo - 11β - hydroxy - 17 - methyl - testosterone or a 17-ester thereof named above, with sodium iodide in acetone, according to techniques known in the art, is productive of 9α-iodo-11β-hydroxy-17-methyltestosterone and esters thereof, respectively.

9α - bromo - 11β - hydroxy - 17 - ethyltestosterone and 17-carboxylic acid esters thereof are similarly prepared by substituting 9(11)-dehydro-17-ethyltestosterone and 17-carboxylic acid esters thereof, respectively, as the starting steroid in the reaction described in Example 5.

In the reaction of Example 5, the N-bromoacetamide produces hypobromous acid in situ. Other N-bromoamides and N-bromoimides may be used or a solution of hypobromous acid per se may be used.

*Example 6.—9,11β-epoxy-17-methyltestosterone (VI)*

A suspension of one gram of 9α-bromo-11β-hydroxy-17-methyltestosterone (V) in thirty milliliters of methanol was titrated with one molar equivalent of 0.1 N aqueous sodium hydroxide. The resulting mixture was diluted with fifty milliliters of water and then chilled to about zero degrees centigrade thereby precipitating 0.64 gram of 9,11β-epoxy-17-methyltestosterone melting at 170 to 176 degrees centigrade which, after crystallization from dilute methanol, melted at 65 to 172 degrees centigrade (with sublimation) and had an $[\alpha]_D$ of minus forty degrees in chloroform and the analysis below.

Calculated for $C_{20}H_{28}O_3$: C, 75.92; H, 8.92. Found: C, 75.60; H, 8.96.

In the same manner as described in Example 6, 17-esters of 9α-bromo-11β-hydroxy-17-methyltestosterone, e. g., 9α-bromo-11β-hydroxy-17-methyltestosterone, 17-acylates wherein the acyl radical is that of an acid named in the paragraph following Example 4, are converted to 17-carboxylic acid esters of 9,11β-epoxy-17-methyltestosterone.

9,11β-epoxy-17-methyltestosterone and 17-carboxylic acid esters thereof are also prepared by substituting 9α-iodo-11β-hydroxy-17-methyltestosterone and 17-carboxylic acid esters thereof, respectively, as the starting steriod in the reaction described in Example 6.

9,11β-epoxy-17-ethyltestosterone and 17-carboxylic acid esters thereof are similarly prepared by substituting 9α- bromo-11β-hydroxy-17-ethyltestosterone and 17-carboxylic acid esters thereof, respectively, as the starting steroid in the reaction described in Example 6.

*Example 7.—9α-fluoro-11β-hydroxy-17-methyltestosterone (VII)*

To a solution of 0.5 gram of 9,11β-epoxy-17-methyltestosterone (VI) in ten milliliters of methylene chloride was added two milliliters of 48 percent aqueous hydrofluoric acid. The mixture was stirred at room temperature for five hours and then cautiously poured with stirring into a mixture of six grams of sodium bicarbonate in a mixture of ice and water. The precipitated steroid was extracted with methylene chloride, the extract washed with water and then dried. The solvent was distilled from the dried solution and the residue crystallized from methylene chloride to give 148 milligrams of 9α-fluoro-11β-hydroxy-17-methyltestosterone melting at 265 degrees centigrade with decomposition, having an $[\alpha]_D$ of plus 110 degrees in chloroform and the analysis below.

Calculated for $C_{20}H_{29}O_3F$: C, 71.40; H, 8.69; F, 5.65. Found: C, 71.71; H, 8.66; F, 5.75.

Similarly, 9α-fluoro-11β-hydroxy-17-ethyltestosterone is prepared by substituting 9,11β-epoxy-7-ethyltestosterone as the starting steroid in Example 7.

*Example 8.—9α-fluoro-11β-hydroxy-17-methyltestosterone, 17-acetate (VII)*

Following the procedure of Example 7 exactly, but substituting a molar equivalent of 9,11β-epoxy-17-methyltestosterone, 17-acetate as the starting steroid, there is thus-produced 9α-fluoro-11β-hydroxy-17-methyltestosterone, 17-acetate.

Following the procedure described in Example 8, but substituting as starting steroid another 17-carboxylic acid ester of 9,11β-epoxy-17-methyltestosterone, e. g., a 9,11β-epoxy-17-methyltestosterone, 17-acylate wherein the acyl radical is that of an acid named in the paragraph following Example 4, there is thus-produced other 17-esters of 9α-fluoro-11β-hydroxy-17-methyltestosterone, e. g., 9α-fluoro - 11β - hydroxy - 17 - methyltestosterone, 17 - acylates wherein the acyl radical is that of a hydrocarbon carboxylic acid containing from one to twelve carbon atoms, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2-, 3-, or 4-methylbenzoic, 2,3-, 2,4-, 2,5-, 2,6-, 3,4- and 3,5-dimethylbenzoic, ethylbenzoic, 2,4,6-trimethylbenzoic, α-naphthoic, 3-methyl-α-naphthoic, an aralkyl acid, e. g., phenylacetic, phenylpropionic, etc.

Similarly, 9α-fluoro-11β-hydroxy-17-ethyltestosterone, 17-acylates are prepared by substituting a 9,11β-epoxy-7-ethyltestosterone, 17-acylate, e. g., wherein the acyl radical is that of an acid named in the paragraph following Example 8, as the starting steroid in the reaction of Example 8.

*Example 9.—9α-chloro-11β-hydroxy-17-methyltestosterone*

Following the procedure of Example 7 exactly, but substituting anhydrous hydrogen chloride for the hydrogen fluoride, there is thus produced 9α-chloro-11β-hydroxy-17-methyltestosterone.

Similarly, 17-carboxylic acid esters, e. g., 9α-chloro-11β-hydroxy-17-methyltestosterone, 17-acylates wherein the acyl radical is that of an acid named in the paragraph following Example 4, are produced by substituting a 9,11β-epoxy-17-methyltestosterone, 17-acylate, e. g., wherein the acyl radical is that of an acid named in the paragraph following Example 4, as the starting steroid in the reaction described in Example 9.

Following the procedure of Example 9, but substituting as starting steriod 9,11β-epoxy-17-ethyltestosterone or a 9,11β-epoxy-17-ethyltestosterone, 17-acylate wherein the acyl radical is, for example, that of an acid named in the paragraph following Example 4, there is thus-produced 9α - chloro - 11β - hydroxy - 17 - ethyltestosterone and 9α-chloro-17-ethyltestosterone, 17-acylates, respectively.

The 9α-chloro- and 9α-fluoro-11β-hydroxy-17-alkyltestosterones, 17-acylates named above are also prepared by esterification of the corresponding free 17-hydroxy compounds in the manner described in Example 4.

*Example 10.—9α-fluoro-11-keto-17-methyltestosterone (VIII)*

To a solution of 0.457 gram of 9α-fluoro-11β-hydroxy-17-methyltestosterone (VII) in twenty milliliters of glacial acetic acid was added a solution of 0.25 gram of chromium trioxide and one milliliter of water in twenty milliliters of acetic acid. The mixture was maintained at room temperature for 4.5 hours and then mixed with five milliliters of methanol. The solvent was removed by distillation at reduced pressure and the almost dry residue mixed with twenty milliliters of water. The precipitate was filtered, washed with water and then dried to give 0.362 gram of 9α-fluoro-11-keto-17-methyltestosterone melting at 208 to 212 degrees centigrade and, after crystallization from dilute methanol and then from a mixture of acetone and hexane hydrocarbons, melting at 213 to 220 degrees centigrade, having an $[\alpha]_D$ of plus 144 degrees in chloroform and the analysis below.

Calculated for $C_{20}H_{27}O_3F$: C, 71.83; H, 8.14; F, 5.68. Found: C, 72.13; H, 8.30; F, 5.83.

Following the procedure described in Example 10, but substituting as starting steroid a 9α-fluoro-11β-hydroxy-17-methyltestosterone, 17-acylate named in the paragraph following Example 4, there is thus produced esters of 9α-fluoro-11-keto-17-methyltestosterone, e. g., 9α-fluoro-11-keto-17-methyltestosterone, 17-acylates wherein the acyl radical is, for example, that of an acid named in the paragraph following Example 4.

Similarly, substituting 9α-chloro-11β-hydroxy-17-methyltestosterone as the starting steroid in the reaction described in Example 10, there is thus-produced 9α-chloro-11-keto-17-methyltestosterone.

Substituting 9α-fluoro-11β-hydroxy-17-ethyltestosterone or 9α-fluoro-11β-hydroxy-17-ethyltestosterone, 17-acylates wherein the acyl radical is, for example, that of an acid named in the paragraph following Example 8 as the starting steroid in Example 10, there is thus-produced 9α-fluoro-11-keto-17-ethyltestosterone and 9α-fluoro-11-keto-17-ethyl-testosterone, 17-acylates, respectively. The 9α-chloro-11-keto-17-ethyltestosterone and 17-acylates thereof are similarly prepared from the corresponding 9α-chloro-11β-hydroxy compounds.

*3-keto-9α-fluoro-17α-methyl-1,4-androstadiene-11β,17β-diol*

Eight milliliters (0.068 mole) of ethyl oxalate and 10.6 milliliters (0.023 mole) of a 2.2 Normal methanolic solution of sodium methoxide is added to a solution of 6.3 grams (0.021 mole) of 9(11)-dehydro-17-methyltestosterone in 100 milliliters of anhydrous tertiary butyl alcohol at about fifty degrees centigrade. The mixture is maintained at room temperature for three hours, during which time the sodium enolate of 2-ethoxyoxalyl-9(11)-dehydro-17-methyltestosterone precipitates. The mixture is neutralized with glacial acetic acid.

To the thus-obtained solution of the 2-ethoxyoxalyl-9(11)-dehydro-17-methyltestosterone is added 140 milliliters of methanol, the mixture cooled to zero degrees centigrade in an ice bath and a solution of 3.7 grams (0.023 mole) of bromine in 74 milliliters of methanol is then added dropwise thereto over a period of about fifteen minutes to produce 2-bromo-2-ethoxyoxalyl-9(11)-dehydro-17-methyltestosterone. To the resulting mixture is then added about 25 milligrams of phenol and 33 milliliters (0.05 mole) of a 1.5 Normal methanolic solution of sodium methoxide whereafter the mixture is heated for five minutes on a steam bath followed by the addition of the cooled solution to water. A precipitate of 2-bromo-9(11)-dehydro-17-methyltestosterone forms, which is thoroughly washed with water and dried in a vacuum desiccator.

A mixture of 758 milligrams (0.2 millimole) of 2-bromo-9(11)-dehydro-17-methyltestosterone and 1.2 milliliters of γ-collidine is heated at the refluxing temperature of the mixture for thirty minutes and then cooled to room temperature. The cooled mixture is diluted with ether and the collidine hydrobromide which precipitates is filtered from the solution. The filtrate is washed with dilute sulfuric acid followed by water and then dried over anhydrous sodium sulfate. The dried solution is freed of solvent and the oily residue chromatographed over four grams of alumina. The column is developed with Skellysolve B hexane hydrocarbons containing increasing amounts of acetone. 3-keto-17α-methyl-1,4,9(11)-androstatrien-17β-ol is thus isolated from the other reaction products.

Following the procedures of Examples 5 to 7 exactly, but substituting 3-keto-17α-methyl-1,4,9(11)-androstatrien-17β-ol as the starting steroid, there is thus-produced 1-dehydro-9α-fluoro - 11β-hydroxy-17-methyltestosterone which is converted to 17-hydrocarbon carboxylic acid esters thereof according to the procedure of Example 8 and the paragraph following. 1-dehydro-9α-chloro-11β-hydroxy-17-methyltestosterone is similarly prepared according to the procedure of Example 9, employing 3-keto-17α-methyl-9,11β-epoxy-1,4-androstadien-17β-ol in the reaction described in Example 9. Its 17-acetate is prepared by substitution of the free alcohol as the starting steroid of Example 8. Other 17-hydrocarbon carboxylic acid esters are prepared in the manner described in the paragraph following Example 8. 1-dehydro-9α-fluoro-11-keto-17-methyltestosterone and its esters are prepared by substituting 1-dehydro-9α-fluoro-11β-hydroxy-17-methyltestosterone and its 17-esters, respectively, in the reaction described in Example 10.

The application is a division of application Serial No. 527,118, filed August 8, 1955.

It is to be understood that the invention is not to be limited to the exact details of operation or exact compounds shown and described, as obvious modifications will be apparent to one skilled in the art, and the invention is therefore to be limited only by the scope of the appended claims.

I claim:
1. 9α-halo-11-keto-17-alkyltestosterones represented by the following formula

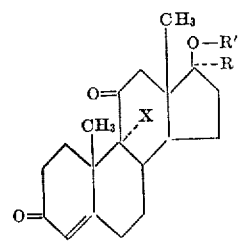

wherein R' is selected from the group consisting of hydrogen and the acyl radical of a hydrocarbon carboxylic acid containing from one to twelve carbon atoms, inclusive, and wherein R is a lower-alkyl group containing less than three carbon atoms, and wherein X is a halogen having an atomic weight from 19 to 127, inclusive.

2. 9α-halo-11-keto-17-methyltestosterones represented by the following formula

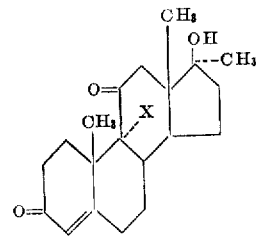

wherein X is a halogen having an atomic weight from 19 to 36, inclusive.

3. 9α-fluoro-11-keto-17-methyltestosterone.

No references cited.

UNITED STATES PATENT OFFICE
Certificate of Correction

Patent No. 2,793,218                             May 21, 1957

Milton E. Herr

It is hereby certified that error appears in the printed specification of the above numbered patent requiring correction and that the said Letters Patent should read as corrected below.

Column 2, lines 1 to 11, Formula VII should appear as shown below instead of as in the patent—

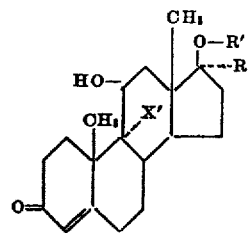

same column, line 23, for "9a-hydroxy-" read —9a-fluoro-11β-hydroxy- —; column 7, line 57, for "7-ethyltestosterone" read —17-ethyltestosterone—.

Signed and sealed this 24th day of September 1957.

[SEAL]

Attest:
KARL H. AXLINE,
*Attesting Officer,*

ROBERT C. WATSON,
*Commissioner of Patents.*